2,848,460
PURIFICATION OF MALEIC ANHYDRIDE

Howard David Cummings, St. Louis, Mo., assignor to Monsanto Chemical Company, St. Louis, Mo., a corporation of Delaware No Drawing. Application December 20, 1954
Serial No. 476,571

7 Claims. (Cl. 260—346.8)

This invention relates to purification of maleic anhydride and more specifically pertains to a method for refining maleic anhydride produced by catalytic vapor-phase oxidation containing chromogenic bodies.

Maleic anhydride is produced by the vapor-phase oxidation of organic compounds such as for example, benzene, toluene, naphthalene, methylnaphthalene, phenol, cresol, benzophenone, furan, biphenyl, furfural, n-butane, 1-butene, 2-butene, butadiene, heptane, isooctane, crotonaldehyde and crotonic acid among others with a high ratio of air to the organic compound. Maleic anhydride together with other organic acids, chromogenic bodies and combustion products such as carbon dioxide and water, appear in the gases coming from the vapor-phase oxidation reactor. In some oxidation processes maleic anhydride is produced as a by-product of the reaction such as for example in the oxidation of naphthalene where the main dicarboxylic acid anhydride produced is phthalic anhydride. In this process the phthalic anhydride is condensed out of the mixture of gases before the maleic anhydride is recovered. In any case, the maleic anhydride content of the gaseous mixture obtained from the vapor-phase oxidation process contains a relatively small amount of maleic anhydride being at the most in the range of from about 0.1 to 1.0 mole percent.

Numerous processes have been suggested for the recovery of maleic anhydride from such lean vaporous mixtures; for example, it has been proposed that the vaporous mixture be subjected to a preliminary cooling to obtain a partial condensation of maleic anhydride therefrom followed by further treatment of the vaporous mixture to effect removal of the remaining condensable vapors. It has also been proposed to conduct a vaporous mixture through a solvent to absorb maleic anhydride and other absorbable products from the gaseous and vaporous mixture and then recovering the maleic anhydride from the resulting solvent solution. In addition, it has been proposed to conduct the vaporous mixtures into water to form an aqueous solution of maleic acid and other water-soluble materials from which maleic acid must be recovered and then dehydrated to maleic anhydride. Maleic anhydride products condensed by some methods is exceedingly dark in color, while that recovered by other methods is not as dark, but a common property of all maleic anhydride products recovered from a vaporous mixture obtained from the vapor-phase oxidation processes is the presence of colored and/or color-forming impurities herein referred to as chromogenic bodies.

Among the first attempts to obtain a maleic anhydride free from chromogenic bodies was the distillation or fractionation of crude maleic anhydride, that is, maleic anhydride containing chromogenic bodies. With such a distillation process, a vastly improved light colored maleic anhydride product was obtained but this product was definitely not white. The color of such a distilled product varied from a light yellow or gray to a yellow or gray product.

It was later proposed to "heat age" crude maleic anhydride by a process which consisted merely in heating crude maleic anhydride at or slightly above its boiling point at atmospheric pressure under reflux conditions for a period of time of from 2 to 10 or more hours. Temperatures below the boiling point of maleic anhydride, that is, below 200° C. and as low as about 130° C. were said to be of some value in the refining of maleic anhydride. However, these lower temperatures required a heat aging process of as long as ten days. The heat aged maleic anhydride while molten was charged to distillation equipment and then fractionated at reduced pressure. The maleic anhydride product refined by this process was of an improved quality over that obtained by the fractionation process.

One process for refining crude maleic anhydride comprises heating molten crude maleic anhydride under slightly reduced pressure to "strip off" and completely dry the crude maleic anhydride product. Thereafter, the crude maleic anhydride is heated under reflux conditions alone or with such "cooking agents" as sulfuric acid; the oxy acids of phosphorus, arsenic or antimony; nitrates among others for varying lengths of time. The maleic anhydride thus treated is charged to distillation equipment while molten, and then subjected to fractionation preferably at reduced pressure.

It has now been discovered that a highly refined maleic anhydride product can be easily and readily obtained by cooking a crude maleic anhydride in the presence of fumaric acid for a short period of time and then recovering the maleic anhydride by fractionation, preferably at reduced pressure. There is no forerun of colored anhydride product which must be recycled to a subsequent refining process, rather a maleic anhydride product of extremely light color and high purity can be obtained within a very narrow temperature range leaving behind only a very small residue which is water-soluble. By this new process as much as 97% of the maleic anhydride in the crude maleic anhydride charged to the refining process can be recovered having a boiling point of 113 to 114° C. at 50 mm. Hg absolute. This process leaves 1% or less of the total crude maleic anhydride charged to the process as still bottoms with the remainder being held up in the distillation equipment.

The process of this invention is most unique in that it would be thought that the same results would be obtained by merely heating at reflux temperatures the crude maleic anhydride obtained from a dehydration process since such maleic anhydride would contain some fumaric acid. Of course, according to some of the processes of the prior art, crude maleic anhydride obtained from a dehydration process was heat aged in the presence of fumaric acid but apparently this heat againg in the presence of fumaric acid had little or no effect on the chromogenic bodies present. Consequently, this heat aged maleic anhydride when subjected to fractionation at reduced pressure did not yield a high quality maleic anhydride. Thus, it became the practice when crude maleic anhydride was obtained from a dehydration process to distill the product obtained by the dehydration process, to separate the maleic anhydride from any fumaric acid formed during the dehydration process, this only produced a second crude maleic anhydride which was only slightly better than maleic anhydride first obtained from the dehydration step. This distilled crude maleic anhydride in the past has been subjected to heat aging with or without cooking agents and then fractionated at reduced pressure to prepare a refined maleic anhydride product which was the best then available.

More specifically, the process of this invention comprises subjecting crude maleic anhydride to the action of fumaric acid at or above the boiling point of maleic anhydride and then fractionating the resulting mixture at reduced pressure of below 100 mm. Hg absolute to obtain a refined maleic anhydride of exceedingly high quality. Preferably, the process of this invention comprises subjecting stripped, crude maleic anhydride to a heating process comprising heating together the stripped crude maleic anhydride and fumaric acid at a temperature of from about 190° C. up to but not exceeding the boiling point of fumaric acid at atmospheric pressure, and then subjecting the molten mass to fractionation at a reduced pressure of from about 100 mm. Hg to about 10 mm. Hg to produce a highly refined maleic anhydride product. The material remaining in the distillation equipment as a still residue is neither a tarry nor a coke-like material and can be readily removed from the distillation equipment merely by adding water to flush the residue to the sewer. The maleic anhydride obtained from the process of this invention can be used in the preparation of exceedingly light-colored resinous products which were not obtainable from the refined maleic anhydride heretofore produced.

In following the practices of this invention, the amount of fumaric acid to be used to obtain optimum results will be found to be about 1% by weight based upon the total weight of the crude maleic anhydride product. However, larger quantities of fumaric acid can be employed, the quantity of fumaric acid being limited solely by its effect on the economics of the refining process. In some instances it will be found desirable to add say as much as 2 to 5% of fumaric acid to very dark crude maleic anhydride.

The process of this invention will be described in greater detail in the specific examples which follow wherein the term "parts" is employed to indicate parts by weight.

*Example I*

1000 parts of a crude maleic anhydride obtained by distilling directly condensed maleic anhydride at 50 mm. Hg are heated at atmospheric boiling point (200° to 205° C.) with 10 parts of fumaric acid for about 2 hours. The resulting mixture is distilled at 50 mm. Hg at 113 to 114° C. There is recovered 970 parts of the maleic anhydride product which appears to be white. The color of this product corresponds to an A. P. H. A. of less than 10.

In contrast, directly condensed maleic anhydride strip distilled at 50 mm. Hg, heat aged at 200° C. for 2 hours, and then distilled at 50 mm. Hg and 113° to 114° C. has a color corresponding to an A. P. H. A. No. of 45.

From the foregoing, it is apparent that the process of this invention is capable of producing an exceedingly high quality maleic anhydride.

To be an acceptable high quality maleic anhydride for use in the manufacture of resinous materials, maleic anhydride when melted should have a color corresponding to an A. P. H. A. No. of 10 or less. The process of this invention not only produces a maleic anhydride product from directly condensed maleic anhydride, which will meet the requirements of the trade, but also will improve the quality of maleic anhydride obtained from a dehydration process as will be illustrated in the following example.

*Example II*

Maleic anhydride obtained by distilling at 100 mm. Hg maleic anhydride obtained by the dehydration of maleic acid had a color corresponding to an A. P. H. A. No. of above 500. 1000 parts of this maleic anhydride are heated with 10 parts of fumaric acid for about 2 hours at 202° C. The resulting mixture was transferred to distillation equipment and distilled at 50 mm. Hg at 113 to 114° C. About 990 parts by weight of maleic anhydride having a color corresponding to an A. P. H. A. No. of less than 10 are recovered.

Crude maleic anhydride obtained by the direct condensation from a stream containing phthalic anhydride can also be used in the process of this invention and will result in a high quality product especially if stripped at reduced pressure prior to heat aging or cooking with fumaric acid.

To those skilled in the art many obvious deviations from the precise manipulative steps set forth in the specific examples will be apparent, also the precise quantities of materials employed can be adjusted according to the sized limitations of the equipment employed. Hence, it is to be understood that the above description is given by way of illustration only and not of limitation and that deviations are possible within the spirit of the invention.

What is claimed is:

1. In the process for refining maleic anhydride, the improvement comprising heating a crude maleic anhydride in the presence of fumaric acid at a temperature above 130° C.

2. In the process for refining maleic anhydride, the improvement comprising heating the crude stripped maleic anhydride in the presence of fumaric acid at atmospheric pressure at a temperature of about 200° C., and recovering the maleic anhydride by distillation.

3. The process of claim 2 wherein the amount of fumaric acid is 1% by weight of the crude maleic anhydride.

4. The process comprising heating crude maleic anhydride in the presence of fumaric acid at a temperature of from 130° C. to about the boiling point at atmospheric pressure and recovering maleic anhydride by distilling the resulting mixture.

5. The process of claim 4 wherein the maleic anhydride is recovered at reduced pressure.

6. The process of claim 4 wherein the maleic anhydride is recovered at a reduced pressure of from about 50 to about 100 mm. Hg.

7. The process of claim 4 wherein the crude maleic anhydride is a material recovered from the stripped distillation of highly colored maleic anhydride.

References Cited in the file of this patent

UNITED STATES PATENTS

| | | |
|---|---|---|
| 2,129,166 | Crowell | Sept. 6, 1938 |
| 2,134,531 | Punnett | Oct. 25, 1938 |
| 2,296,218 | Middleton | Sept. 15, 1942 |
| 2,343,536 | Crowell | Mar. 7, 1944 |
| 2,567,404 | Ross | Sept. 11, 1951 |